(12) United States Patent
McFarlane et al.

(10) Patent No.: US 9,032,793 B1
(45) Date of Patent: May 19, 2015

(54) WHEEL BALANCER

(75) Inventors: David A. McFarlane, Baldwin City, KS (US); Matthew Scott Dunn, Baldwin City, KS (US)

(73) Assignee: Horizon, LLC, Baldwin, KS (US)

( * ) Notice: Subject to any disclaimer, the term of this patent is extended or adjusted under 35 U.S.C. 154(b) by 558 days.

(21) Appl. No.: 13/432,922

(22) Filed: Mar. 28, 2012

Related U.S. Application Data

(63) Continuation of application No. 13/413,398, filed on Mar. 6, 2012, now abandoned.

(51) Int. Cl.
*G01M 1/00* (2006.01)
*G01M 1/02* (2006.01)
*B60B 30/00* (2006.01)

(52) U.S. Cl.
CPC . *G01M 1/02* (2013.01); *B60B 30/00* (2013.01)

(58) Field of Classification Search
CPC ......... G01M 1/00; G01M 1/02; G01M 1/045; B60B 30/00
USPC .................................... 73/486, 487; 301/5.21
See application file for complete search history.

(56) References Cited

U.S. PATENT DOCUMENTS

| | | | |
|---|---|---|---|
| 2,512,231 A | 6/1950 | Hart | |
| 3,992,950 A | 11/1976 | Pflieger | |
| 4,051,733 A | 10/1977 | Tomkin | |
| 4,194,399 A | 3/1980 | Wilson | |
| 4,448,073 A | 5/1984 | Patry | |
| 5,097,580 A * | 3/1992 | Story | 29/221.5 |
| 5,109,213 A * | 4/1992 | Williams | 340/447 |
| 5,929,334 A | 7/1999 | Kautzky | |
| 2005/0108871 A1* | 5/2005 | Boni et al. | 29/705 |
| 2005/0211965 A1* | 9/2005 | Nam | 254/331 |
| 2008/0174166 A1* | 7/2008 | Kalil | 301/5.1 |
| 2008/0216567 A1* | 9/2008 | Breed | 73/146.5 |
| 2014/0151169 A1* | 6/2014 | Wehr et al. | 188/269 |

OTHER PUBLICATIONS

McFarlane ("McFarlane Aviation Wheel Balancer," Aug. 18, 2011, McFarlane Aviation, Inc., http://www.mcfarlane-aviation.com/pdfDocuments/TOOL108%20Instructions.pdf; accessed on Feb. 9, 2015).*

"McFarlane Aviation Products—Aircraft Wheel Balancer," Mar. 21, 2012, McFarlane Aviation Products, http://www.mcfarlaneaviation.com/Details.aspx?ID=54529635&Article=348; accessed on Feb. 9, 2015.*

* cited by examiner

*Primary Examiner* — Laura Martin
*Assistant Examiner* — Samir M Shah
(74) *Attorney, Agent, or Firm* — Lathrop & Gage LLP

(57) ABSTRACT

Wheel balancers and methods of their use are disclosed. One wheel balancer includes a cable and a base. The cable has a support end for being fastened to a support. The base is configured for receipt inside a wheel, and the base has proximal and distal ends and a hollow interior area for passing the cable therethrough. The cable passes through the base interior area and is operatively coupled to the base such that a distance between the cable support end and the base distal end is generally constant when the cable is extended. A pivot point for the cable is movable relative to the base between the base distal end and the cable support end.

20 Claims, 5 Drawing Sheets

WHEEL BALANCER

RELATED APPLICATIONS

This application is a continuation of U.S. patent application Ser. No. 13/413,398, filed Mar. 6, 2012 now abandoned, the disclosure of which is incorporated herein by reference.

BACKGROUND

The invention relates generally to the field of devices for balancing wheel and tire assemblies. Balancing a wheel and tire assembly, such as that used on aircraft and other vehicles, typically refers to placing weight on the wheel such that the assembly spins in use without causing vibration or uneven wear. The current invention relates specifically to an apparatus and method for use in determining where weight should be distributed about a wheel when balancing a wheel and tire assembly.

SUMMARY

The present invention is defined by the claims below. According to one embodiment, a wheel balancer includes a cable, a piston, and a base. The piston has proximal and distal ends and a hollow interior area for passing the cable therethrough. The base similarly has proximal and distal ends and a hollow interior area for passing the cable therethrough. The piston is extendable and retractable relative to the base such that the piston distal end is movable toward and away from the base distal end. The cable passes through the piston interior area and the base interior area and is operatively coupled to the base. A restriction is along the hollow interior area of the piston; the restriction is movable with the piston and forms a pivot point for the cable.

According to another embodiment, a wheel balancer includes a cable, a first member, and a second member. The cable has a support end for being fastened to a support. The first member has proximal and distal ends and a hollow interior area for passing the cable therethrough. The cable passes through the first member interior area and is operatively coupled to the first member such that a distance between the cable support end and the first member distal end is generally constant when the cable is extended. The second member is extendable and retractable relative to the first member such that a distal end of the second member is movable toward and away from the first member distal end. The cable passes through a hollow interior area of the second member. A restriction is along the hollow interior area of the second member; the restriction is movable with the second member and forms a pivot point for the cable. Structure is included for indicating orientation of the second member relative to the cable.

According to still another embodiment, a wheel balancer includes a cable and a base. The cable has a support end for being fastened to a support. The base is configured for receipt inside a wheel, and the base has proximal and distal ends and a hollow interior area for passing the cable therethrough. The cable passes through the base interior area and is operatively coupled to the base such that a distance between the cable support end and the base distal end is generally constant when the cable is extended. A pivot point for the cable is movable relative to the base between the base distal end and the cable support end.

BRIEF DESCRIPTION OF THE DRAWINGS

Illustrative embodiments of the present invention are described in detail below with reference to the attached drawings.

FIG. 4b is a partial view taken from FIG. 4a.

DETAILED DESCRIPTION

Figure 1:
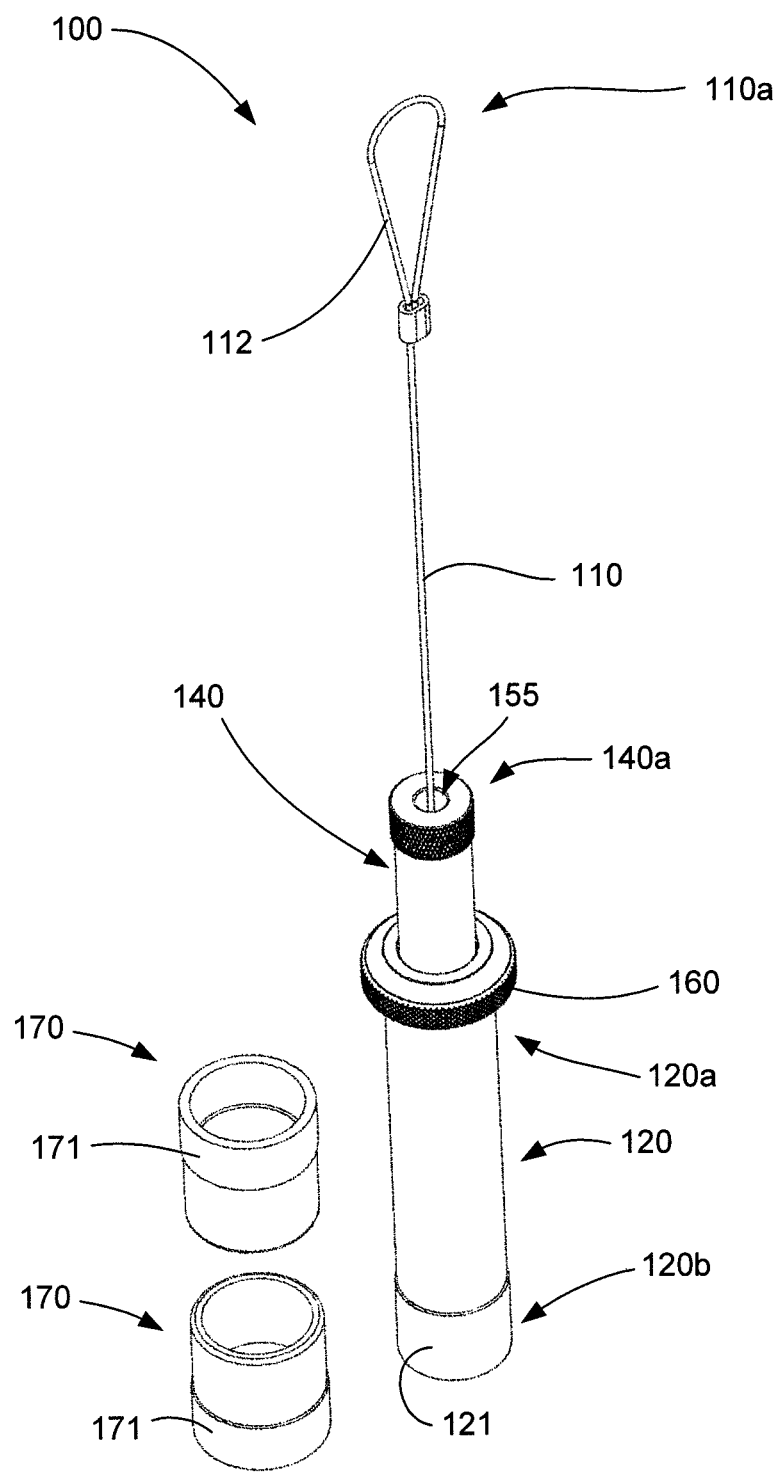
FIG. 1 is an isometric view of a wheel balancer according to an embodiment.

Embodiments of the present invention provide wheel balancers and methods of using wheel balancers. FIGS. 1 through 4b disclose a wheel balancer 100 that may be used to balance wheel and tire assemblies 10, such as those used on aircraft and other vehicles.

The wheel balancer 100 includes a cable 110 having a support end 110a (FIGS. 1 and 3) for being fastened to a support; a base 120 (FIGS. 1-4b) having proximal and distal ends 120a, 120b; and a pivot point 150 (FIG. 4b) for the cable 110 that is movable relative to the base 120 between the base distal end 120b and the cable support end 110a. Means may be included for coupling the cable 110 to the support. For example, a loop 112 may be formed at the cable support end 110a, a hook may be coupled to the cable support end 110a, or any other appropriate fastening mechanisms (whether now known or later developed) may be utilized.

Figure 3:
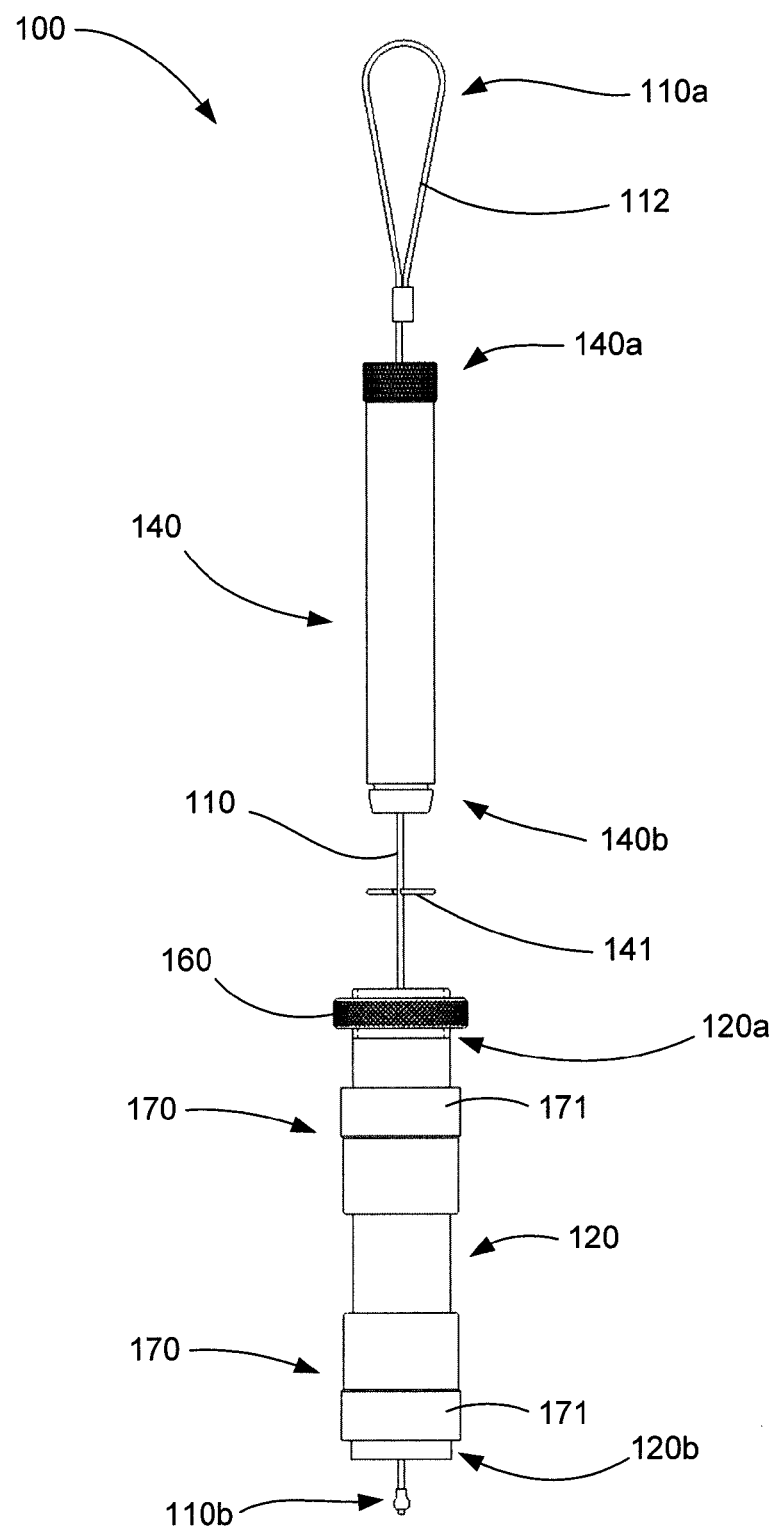
FIG. 3 is an exploded view of the wheel balancer of FIG. 1.
Figure 4A:
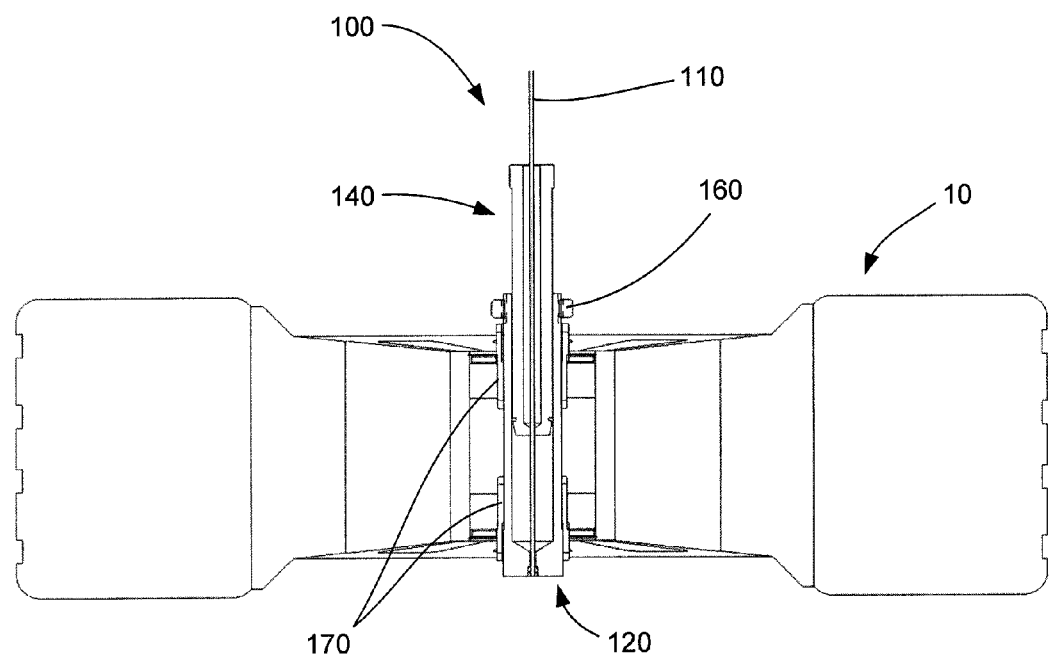
FIG. 4a is a cross-sectional view of part of the wheel balancer of FIG. 1, shown in use with a wheel and tire assembly.
Figure 4B:
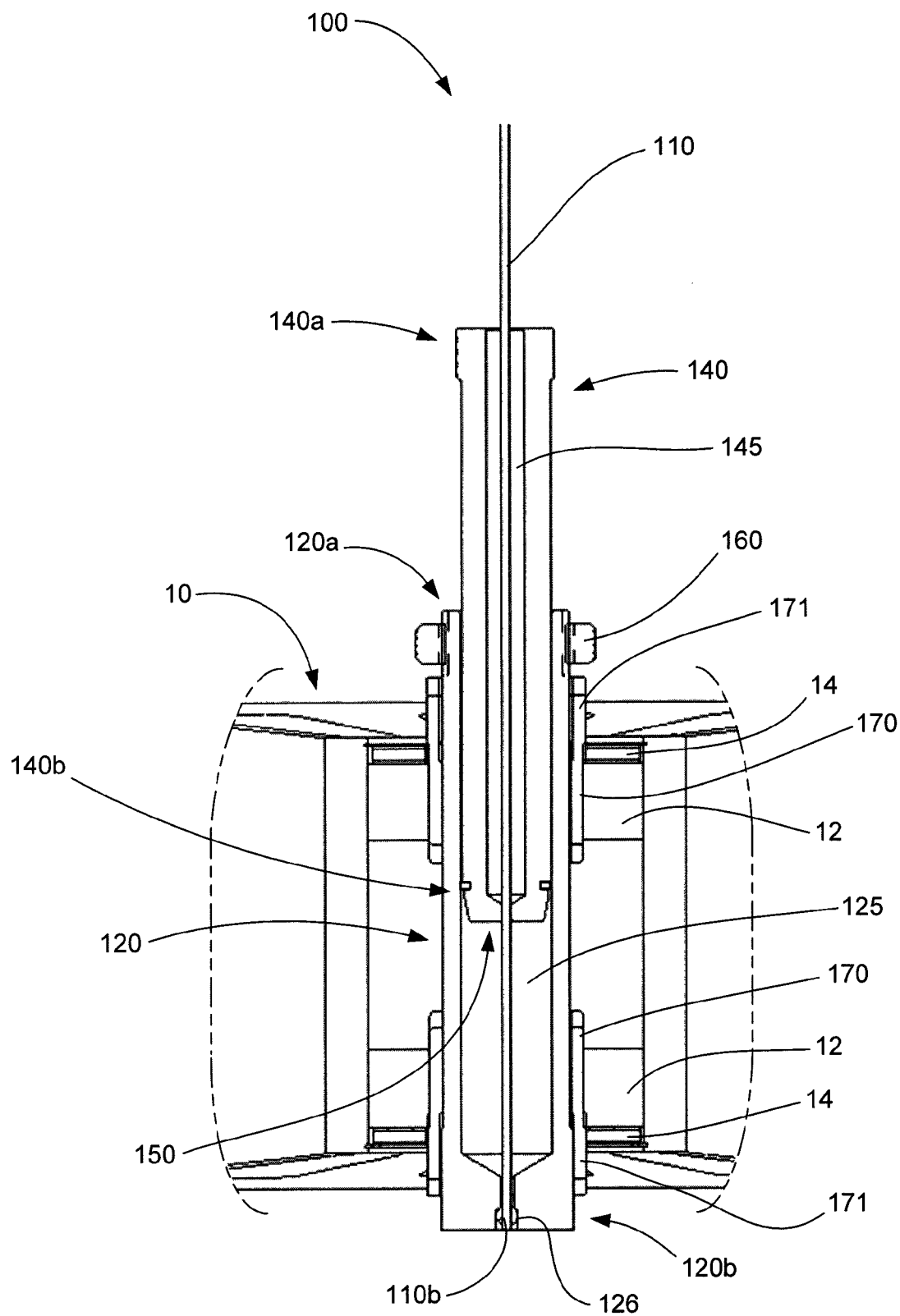

Looking specifically at the base 120, the base 120 is configured for receipt inside a wheel of the wheel and tire assemblies 10 (FIG. 4b) and may include an external lip 121 at the distal end 120b. As shown in the drawings, the base 120 may be configured for receipt specifically inside wheel bearings 12. However, those skilled in the art will appreciate that the wheel bearings 12 may be removed, and that the base 120 need not be sized for receipt inside the wheel bearings 12. The base 120 may be constructed of metals (e.g., aluminum, steel, etc.), wood, plastics, composites, and/or other appropriate materials, and includes a hollow interior area 125 for passing the cable 110 therethrough. The cable 110 extends through the hollow interior area 125 and is operatively coupled to the base 120. It may be desirable for the cable 110 to be operatively coupled to the base 120 at the base distal end 120b, and the cable 110 may be operatively coupled to the base 120 in various ways. For example, as shown in FIGS. 3 and 4b, a terminal end 110b of the cable 110 may be seated in a complementary cavity 126 at the base distal end 120b. A distance between the base distal end 120b and the cable support end 110a is generally constant when the cable 110 is extended.

A second member (or "piston") 140 having proximal and distal ends 140a, 140b is extendable and retractable relative to the base 120 such that the distal end 140b is movable toward and away from the base distal end 120b. The second member 140 may be extended and retracted relative to the base 120 in various ways; it may be particularly desirable, as shown in the drawings, for the members 120, 140 to be slidable relative to one another (e.g., with the piston 140 extending inside the base 120). Particularly in slidable embodiments, a snap ring 141 (FIG. 3), packing material, or other appropriate substances may aid in maintaining the position of the base 120 and the second member 140 constant relative to one another except for when adjustment is desired. In other embodiments, the members 120, 140 may be threadably connected or otherwise adjustable.

As shown in FIG. 4b, the piston 140 has a hollow interior area 145 for passing the cable 110 therethrough, and the cable 110 passes through the interior area 145. A restriction 150 along the hollow interior area 145 of the piston 140 is movable with the piston 140 and forms a pivot point for the cable 110. While the restriction 150 may be at various locations along the interior area 145, it may be particularly desirable for the restriction 150 to be at the distal end 140*b*. The piston 140 may be constructed of metals (e.g., aluminum, steel, etc.), wood, plastics, composites, and/or other appropriate materials.

Figure 2:
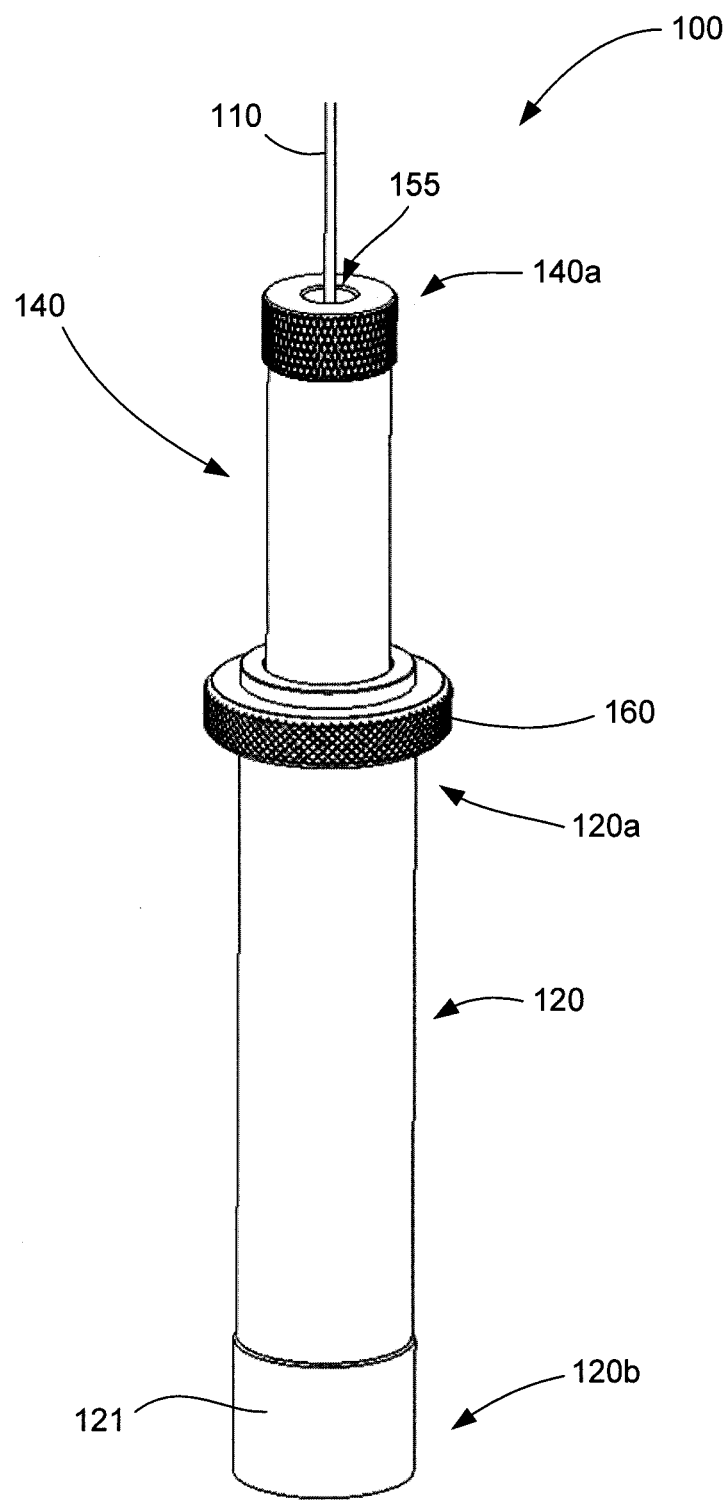
FIG. 2 is a partial view of the wheel balancer of FIG. 1.

Structure (e.g., at the piston proximal end 140*a*) may be desirable for indicating orientation of the piston 140 (and the accompanying base 120) relative to the cable 110. Various structure may be utilized, such as a circular opening 155 (FIGS. 1 and 2). If a circular opening 155 is not used, indicia (e.g., crosshairs) on the structure may be particularly helpful in indicating orientation; however, indicia may be used with a circular opening 155 as well. For embodiments with the circular opening 155, the cable 110 may pass through a centerpoint of the circular opening 155 when the cable 110 extends linearly from the base distal end 120*b* to past the piston proximal end 140*a*.

A retaining nut 160 (shown throughout the drawings) and bushings 170 (FIGS. 1, 3, and 4*b*) may be included for handling and attachment purposes. The retaining nut 160 may, for example, be removably coupled to the base 120 adjacent the base proximal end 120*a*, and may keep the base 120 in the wheel and tire assemblies 10 while handling. The bushings 170 may allow the base 120 to be used with wheel and tire assemblies 10 having different axle sizes, as described in further detail below.

In use, the wheel balancer 100 may initially appear as set forth in FIG. 1. For a wheel and tire assembly 10 having an axle size that matches the base 120, the retaining nut 160 is removed and the base 120 is passed through the wheel (in some embodiments, through the wheel bearings 12 and seals 14) such that the assembly 10 is coupled to the base 120; the retaining nut 160 may then be reattached. For a wheel and tire assembly 10 having an axle size that is larger than the base 120, the retaining nut 160 may be removed, one of the bushings 170 may be slid over the base 120, and the base 120 may be passed through the wheel (in some embodiments, through the wheel bearings 12 and seals 14). When in use with the wheel bearings 12 and seals 14, the second bushing 170 may then be slid over the base 120 and through the seals 14 until a lip 171 of the bushing 170 contacts the wheel bearing 12, and the retaining nut 160 may be reattached. Regardless of whether the bushings 170 are used, the wheel and tire assembly 10 may generally include a brake disc or drum during balancing if the wheel is equipped with a brake disc or drum.

Once the wheel balancer 100 is coupled to the wheel and tire assembly 10, the cable 110 may be suspended from any appropriate support (e.g., by the loop 112). The piston 140 may be raised to an uppermost position away from the base distal end 120*b*, minimizing sensitivity in the wheel balancer 100. Once the wheel and tire assembly 10 come to rest, weights may be added and distributed as needed to balance the wheel and tire assembly 10. Balance is achieved when the cable 110 is centered in the circular opening 155.

To increase the sensitivity of the wheel balancer 100 and the precision of the balance, the piston 140 may then be lowered toward the base distal end 120*b*—causing the restriction 150 (and, thus, the pivot point for the cable 110) to move closer to the base distal end 120*b*. Weights may again be added and distributed as needed to balance the wheel and tire assembly 10, and balance is achieved when the cable 110 is centered in the circular opening 155. The piston 140 may be successively lowered and weights may be added and distributed until the desired balance precision is achieved. However, if the restriction 150 (and, thus, the pivot point for the cable 110) is below the center of gravity for the wheel and tire assembly 10, balancing will become impossible; the piston 140 should then be moved upwardly (i.e., away from the base distal end 120*b*) to verify or alter balance.

Once the desired balance precision is obtained, the retaining nut 160 may be removed and the wheel and tire assembly 10 may be separated from the wheel balancer 100. The weights may then be fixed to the wheel. To obtain the best dynamic balance results, it may be desirable for the weights to be evenly distributed between top and bottom surfaces. Once the weights are fixed to the wheel, the wheel and tire assembly 10 may be reinstalled on the wheel balancer 10 to verify balance, and weights may be added or adjusted if needed.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention. It will be understood that certain features and subcombinations are of utility and may be employed without reference to other features and subcombinations and are contemplated within the scope of the claims.

We claim:

1. A wheel balancer, comprising:
    a cable;
    a piston having proximal and distal ends and a hollow interior area for passing the cable therethrough;
    a base having proximal and distal ends and a hollow interior area for passing the cable therethrough; the piston being extendable and retractable relative to the base such that the piston distal end is movable toward and away from the base distal end; the cable passing through the piston interior area and the base interior area and being operatively coupled to the base; and
    a restriction along the hollow interior area of the piston, the restriction being movable with the piston and forming a pivot point for the cable.

2. The wheel balancer of claim 1, wherein the piston proximal end includes structure for indicating orientation of the piston relative to the cable.

3. The wheel balancer of claim 2, wherein the cable is coupled to the base distal end.

4. The wheel balancer of claim 3, wherein:
    the structure for indicating orientation is a circular opening; and
    the cable, when extending linearly from the base distal end to past the piston proximal end, passes through a centerpoint of the circular opening.

5. The wheel balancer of claim 4, wherein the piston extends inside the base.

6. The wheel balancer of claim 5, wherein the piston is slidable relative to the base for extending and retracting the piston relative to the base.

7. The wheel balancer of claim 6, further comprising a retaining nut removably coupled to the base adjacent the base proximal end.

8. The wheel balancer of claim 7, wherein the base is configured for receipt inside a wheel.

9. The wheel balancer of claim 8, further comprising a bushing for passing between the base and the wheel.

10. The wheel balancer of claim 1, further comprising means for coupling the cable to a support.

11. The wheel balancer of claim 1, wherein the cable is coupled to the base distal end.

12. The wheel balancer of claim 1, wherein the restriction is at the piston distal end.

13. The wheel balancer of claim 1, wherein the base is configured for receipt inside a wheel.

14. The wheel balancer of claim 13, wherein the base is configured for receipt inside wheel bearings.

15. The wheel balancer of claim 1, wherein:
the cable has a support end for being fastened to a support; and
a distance between the cable support end and the base distal end is generally constant when the cable is extended.

16. A wheel balancer, comprising:
a cable having a support end for being fastened to a support;
a first member having proximal and distal ends and a hollow interior area for passing the cable therethrough, the cable passing through the first member interior area and being operatively coupled to the first member such that a distance between the cable support end and the first member distal end is generally constant when the cable is extended;
a second member being extendable and retractable relative to the first member such that a distal end of the second member is movable toward and away from the first member distal end; the cable passing through a hollow interior area of the second member;
a restriction along the hollow interior area of the second member, the restriction being movable with the second member and funning a pivot point for the cable; and
structure for indicating orientation of the second member relative to the cable.

17. The wheel balancer of claim 16, wherein;
the second member extends inside the first member;
the first member is configured for receipt inside a wheel;
the structure for indicating orientation is a circular opening; and
the cable, when extending linearly from the first member distal end to past a proximal end of the second member, passes through a centerpoint of the circular opening.

18. The Wheel balancer of claim 16, wherein the second member is slidable relative to the first member for extending and retracting the second member relative to the first member.

19. The wheel balancer of claim 16, further comprising a bushing for passing between the first member and the wheel.

20. The wheel balancer of claim 16, wherein the second member is a piston.

* * * * *